United States Patent
Anderson et al.

(10) Patent No.: US 6,990,191 B2
(45) Date of Patent: Jan. 24, 2006

(54) METHOD AND APPARATUS FOR HANDLING VOICE AND DATA SIGNALS

(75) Inventors: Jeffrey Jay Anderson, Austin, TX (US); Walter S. Schopfer, Austin, TX (US); Merle L. Miller, Austin, TX (US)

(73) Assignee: Legerity, Inc., Austin, TX (US)

( * ) Notice: Subject to any disclaimer, the term of this patent is extended or adjusted under 35 U.S.C. 154(b) by 668 days.

(21) Appl. No.: 09/751,417

(22) Filed: Dec. 29, 2000

(65) Prior Publication Data

US 2002/0114444 A1    Aug. 22, 2002

(51) Int. Cl.
*H04M 7/04* (2006.01)
(52) U.S. Cl. .................. 379/398; 379/399.01; 379/394
(58) Field of Classification Search ................ 379/398, 379/93.05, 399.07, 394, 399.01
See application file for complete search history.

(56) References Cited

U.S. PATENT DOCUMENTS

| | | | |
|---|---|---|---|
| 4,577,255 A * | 3/1986 | Martin | 361/119 |
| 5,802,169 A * | 9/1998 | Frantz et al. | 379/398 |
| 6,477,249 B1 * | 11/2002 | Williamson et al. | 379/399.01 |
| 6,625,278 B1 * | 9/2003 | Hendricks et al. | 379/398 |

* cited by examiner

*Primary Examiner*—Sinh Tran
*Assistant Examiner*—Walter F Briney, III
(74) *Attorney, Agent, or Firm*—Williams, Morgan & Amerson, P.C.

(57) ABSTRACT

A method and apparatus is provided for impedance matching for an apparatus capable of supporting voice and data. The method includes receiving an input signal having at least one of a voice component, data component, and DC component, and filtering at least a portion of the data component and DC component of the input signal to provide a filtered signal. The method further includes adjusting an input impedance of the apparatus to a first preselected value for the voice band in response to the filtered signal and adjusting the input impedance of the first apparatus from the first preselected value to a second preselected value. The method includes adjusting at least one of a magnitude and phase of the filtered signal to adjust the input impedance to a third value.

24 Claims, 5 Drawing Sheets

METHOD AND APPARATUS FOR HANDLING VOICE AND DATA SIGNALS

BACKGROUND OF THE INVENTION

1. Field of the Invention

This invention relates generally to telecommunications, and, more particularly, to a method and apparatus for handling Plain Old Telephone System (POTS) and x-digital subscriber line (xDSL) signals.

2. Description of the Related Art

In communications systems, particularly telephony, it is common practice to transmit signals between a subscriber station and a central switching office via a two-wire, bi-directional communication channel. A line card generally connects the subscriber station to the central switching office. The functions of the line card range from supplying talk battery to performing impedance matching to handling ringing signals, voice signals, and testing signals.

Equipment connected to telephone lines generally have a standardized impedance. To drive a signal on a subscriber line while minimizing signal reflection from the far end of the subscriber line and maximizing the signal power coming out the far end, it is desirable to match the standardized impedance. This impedance is typically symbolized as $Z_{LOOP}$, which may be a function of frequency and decreases as frequency increases. For POTS lines, the value of $Z_{LOOP}$ is determined by individual telephone authorities in various countries and, although somewhat variable, is in the range of 600–900 ohms and may or may not include some type of capacitive element. The extent to which a signal driver is matched to the standardized impedance in these systems is measured with a parameter known as "return-loss." Perfect matching will have an infinite return-loss. This indicates that none of the incident signal transmitted from a source with the standard impedance is reflected back to the source.

In an electronic Plain Old Telephone System (POTS), the impedance matching function has generally been performed by line cards using a variety of well-known impedance matching filter loops. The function of the impedance matching filter loop in POTS-only applications is to take the input signal, modify it through a programmable gain and phase element, and feed it back to the output so that the input signal sees a different response than it would without the presence of the impedance matching filter. The above-described impedance matching process is generally effective in accomplishing the intended purpose, at least as it pertains to a POTS-only system.

The Plain Old Telephone System, designed primarily for voice communication, provides an inadequate data transmission rate for many modem applications. To meet the demand for high-speed communication, designers have sought innovative and cost-effective solutions that would take advantage of the existing network infrastructure. Several technological solutions proposed in the telecommunications industry use the existing network of telephone wires. A promising one of these technologies is the xDSL (digital subscriber line) technology.

xDSL is making the existing network of subscriber lines more robust and versatile. Once considered virtually unusable for broadband communications, an ordinary twisted pair equipped with DSL interfaces can transmit video, television, and very high-speed data. The fact that more than six hundred million subscriber lines exist around the world is a compelling reason for these lines to be used as the primary transmission conduits for at least several more decades. Because DSL utilizes telephone wiring already installed in virtually every home and business in the world, it has been embraced by many as one of the more promising and viable options.

There are now at least three popular versions of DSL technology, namely Asymmetrical Digital Subscriber Line (ADSL), Very High-Speed Digital Subscriber Line (VDSL), and Symmetric Digital Subscriber Line (SDSL). Although each technology is generally directed at different types of users, they all share certain characteristics. For example, DSL systems utilize the existing, ubiquitous telephone wiring infrastructure, deliver greater bandwidth, and operate by employing special digital signal processing. Because the aforementioned technologies are well known in the art, they will not be described in detail herein.

DSL and Plain Old Telephone System technologies can co-exist in one line (e.g., also referred to as a "subscriber line"). Traditional analog voice band interfaces use the same frequency band, 0–4 Kilohertz (KHz), as telephone service, thereby preventing concurrent voice and data use. A DSL interface, on the other hand, operates at frequencies above the voice channels, from 25 KHz to 1.1 Megahertz (MHz). Standards for certain derivatives of DSL are still in definition, and, therefore, are subject to change. Thus, a single DSL line is capable of offering simultaneous channels for voice and data. It should be noted that the standards for certain derivatives of ADSL are still in definition as of this writing, and therefore are subject to change.

DSL systems use digital signal processing (DSP) to increase throughput and signal quality through common copper telephone wire. It provides a downstream data transfer rate from the DSL Point-of-Presence (POP) to the subscriber location at speeds of up to 1.5 megabits per second (MBPS). The transfer rate of 1.5 MBPS, for instance, is fifty times faster than a conventional 28.8 kilobits per second (KBPS).

Although DSL and POTS systems can co-exist on one line, the DSL traffic passing through the POTS circuitry impairs the functionality of the impedance matching filter of the POTS circuitry. This is because decimators and analog-to-digital converters that are ordinarily utilized in a POTS-only system cannot process the high frequencies of the data band, thus causing the performance of the POTS impedance matching filter to degrade. Additionally, the impedance required at data frequencies is much lower than at voice frequencies.

The present invention is directed to overcoming, or at least reducing the effects of, one or more of the problems set forth above.

SUMMARY OF THE INVENTION

In one aspect of the present invention, a method is provided for impedance matching for an apparatus capable of supporting voice and data. The method includes receiving an input signal having at least one of a voice component, data component, and DC component, and filtering at least a portion of the data component and DC component of the input signal to provide a filtered signal. The method further includes adjusting an input impedance of the apparatus to a first preselected value for the voice band in response to the filtered signal and adjusting the input impedance of the first apparatus from the first preselected value to a second preselected value. The method includes adjusting at least one of a magnitude and phase of the filtered signal to adjust the input impedance to a third value.

In another aspect of the present invention, an apparatus is provided for impedance matching. The apparatus includes circuitry adapted to receive an input signal having at least one of a voice, data, and DC component. The apparatus includes a first and second filter. The first filter is adapted to filter at least a portion of the data component of the input signal to provide a filtered data signal, and the second filter adapted to filter at least a portion of the DC component of the filtered data signal to provide a filtered signal. The apparatus includes a first, second, and third impedance blocks. The first impedance block is adapted to adjust an input impedance of the apparatus to a first preselected value for the voice band in response to the filtered signal. The second impedance block is adapted to adjust the input impedance of the first apparatus from the first preselected value to a second preselected value. The third impedance block is adapted to adjust at least one of a magnitude and phase of the filtered signal to adjust the input impedance to a third value.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
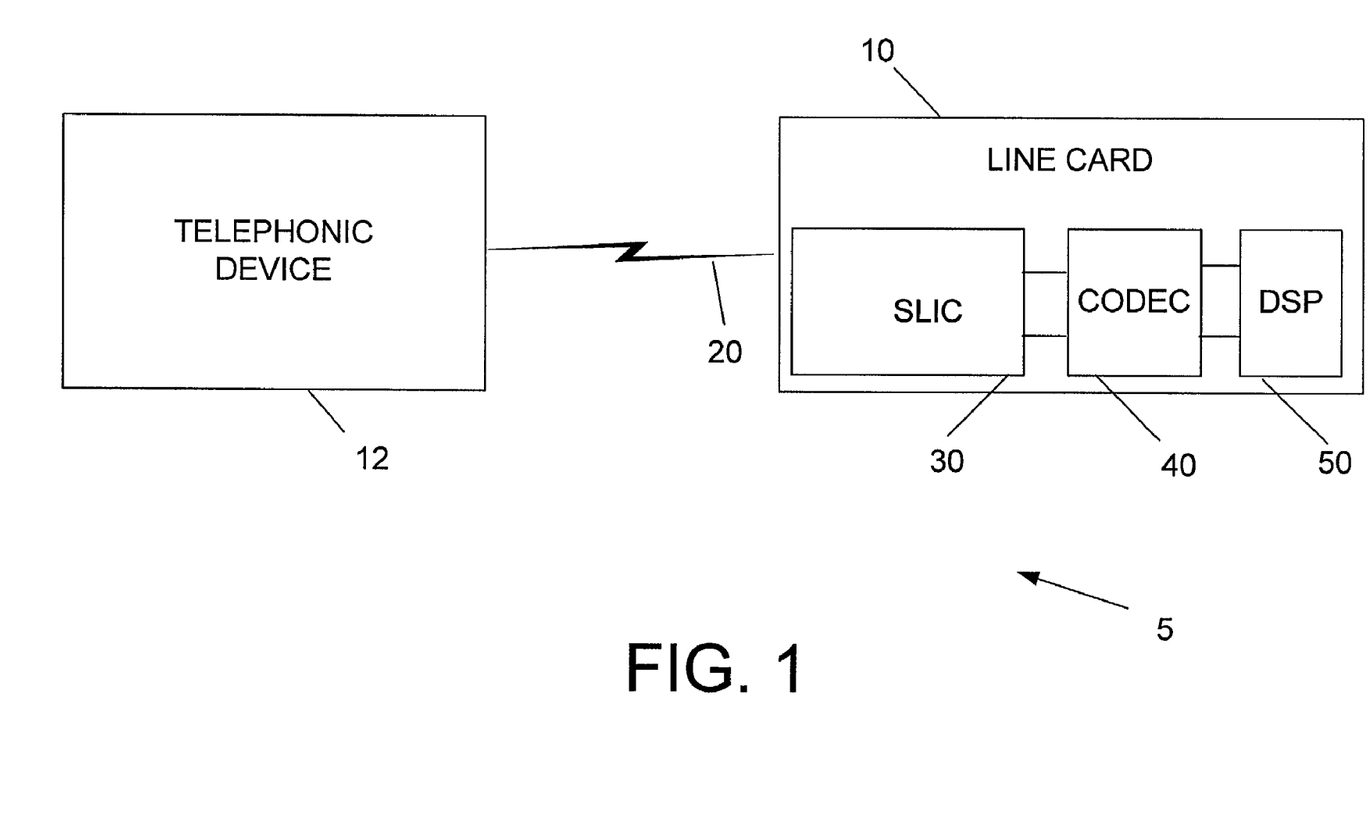
FIG. 1 illustrates a communications system in accordance with the present invention.

Referring first to FIG. 1, a simplified block diagram of a communications system 5 in accordance with the present invention is provided. The communications system 5 includes a line card 10 that interfaces with a telephonic device 12 over a subscriber line 20. In an actual implementation, the line card 10 interfaces with a plurality of subscriber lines 20, but for clarity and ease of illustration, only one is shown. A subscriber line interface circuit (SLIC) 30 is coupled to the subscriber line 20. Hereinafter, signals received by the line card 10 over the subscriber line 20 are referred to as upstream signals, and signals transmitted by the line card 10 on the subscriber line 20 are referred to as downstream signals.

The SLIC supplies an analog upstream signal to a coder/decoder (CODEC) 40. The CODEC 40 receives the analog upstream signal from the SLIC 30 and generates a digital upstream signal that is subsequently passed to a digital signal processor 50. The DSP 50 also provides a digital signal for eventual transmission on the subscriber line 20. The CODEC 40 receives the digital signal, converts it to an analog signal, and provides the analog signal to the SLIC 30, which sends the analog signal over the subscriber line 20.

In the illustrated embodiment, the line card 10, in addition to supporting plain old telephone service (POTS), is adapted to implement an asynchronous digital subscriber line (ADSL) modem for high bandwidth data transfer. The ADSL protocol is described in ANSI T1.413 Issue 2, entitled, "Interface Between Networks and Customer Installation—Asymmetric Digital Subscriber Line (ADSL) Metallic Interface." The SLIC 30 of the line card 10 is capable of performing a variety of functions, such as battery feed, overload protection, polarity reversal, on-hook transmission, and current limiting. Only relevant portions of the SLIC 30, CODEC 40, and DSP 50 are described herein, although those of ordinary skill in the art will appreciate that these devices may perform other functions that are not described in this disclosure.

The telephonic device 12 may comprise a telephone or any other device capable of providing a communication link between at least two users. In one embodiment, the telephonic device 12 may be one of a variety of available conventional telephones, such as wired telephones and similar devices. In an alternative embodiment, the telephonic device 12 may be any device capable of performing a substantially equivalent function of a conventional telephone, which may include, but is not limited to, transmitting and/or receiving voice and data signals. Examples of the telephonic device 12 include a data processing system (DPS) utilizing a modem to perform telephony, a television phone, a DPS working in conjunction with a telephone.

Figure 2:
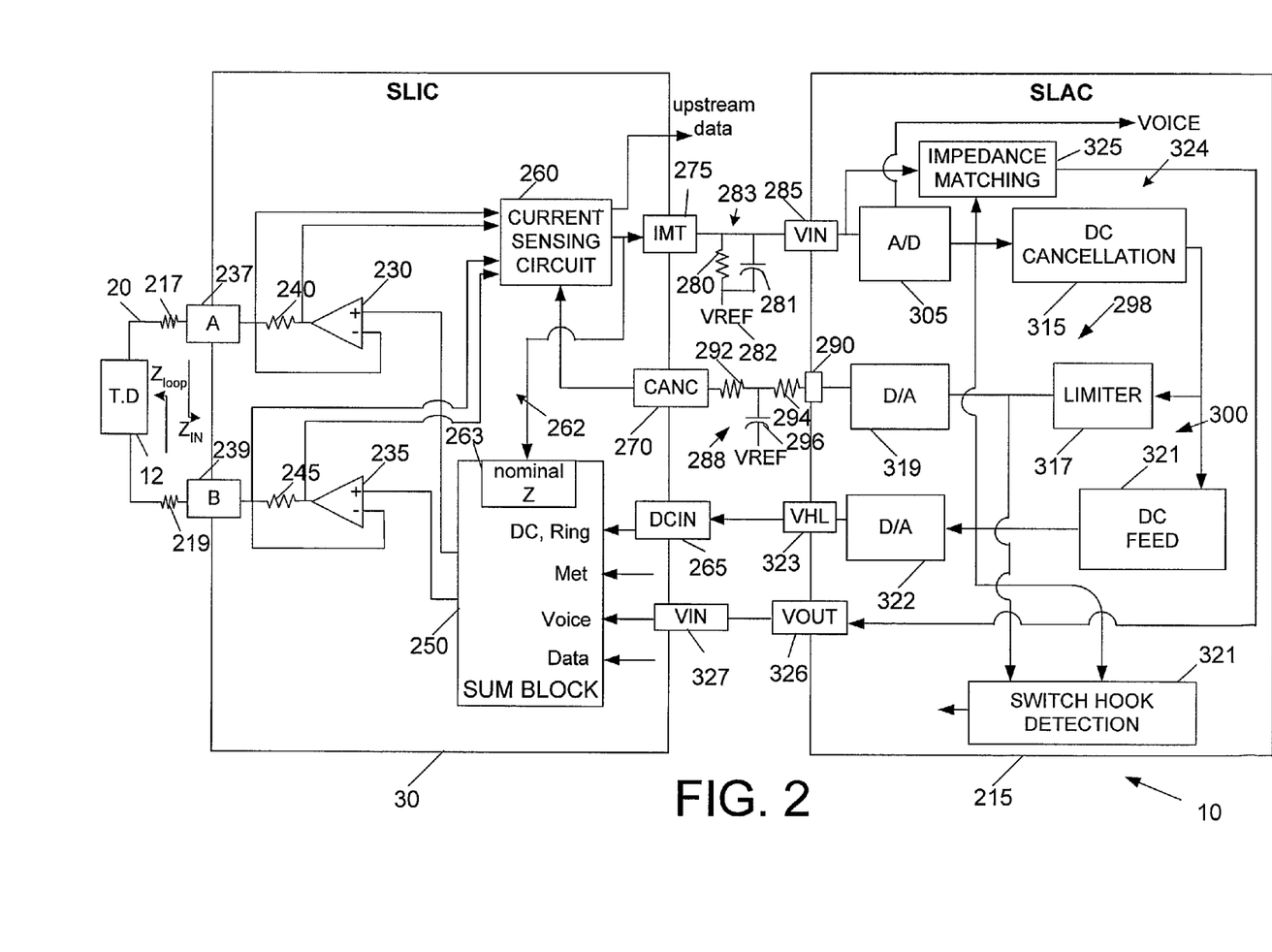
FIG. 2 depicts a block diagram of an embodiment of a line card in accordance with the present invention that can be implemented in the communications system of FIG. 1.

FIG. 2 illustrates one embodiment of the line card 10 in accordance with the present invention. Specifically, the line card 10 includes the SLIC 30, which, in the illustrated embodiment, is a voltage-feed SLIC. The line card 10 also includes the CODEC/DSP 40, 50, which in the illustrated embodiment are shown as a subscriber line audio-process circuit (SLAC) 215 that integrates the functions of both the CODEC and DSP 40, 50. The data band circuits are generally not involved in the impedance setting function and are not shown. The line card 10 may be located at a central office or a remote location somewhere between the central office and the telephonic device 12 (see FIG. 1). The line card 10 interfaces with the telephonic device 12 through tip and ring terminals 237, 239 at the SLIC 30. The combination of the telephone device 12 and the subscriber line 20 is generally referred to as a subscriber loop.

The standard impedance of the subscriber line 20 is herein denoted as $Z_{LOOP}$, and impedance seen by an incoming signal from the subscriber line 20 is hereinafter referred to as $Z_{IN}$. The value of $Z_{LOOP}$, which is determined by individual telephone authorities in various countries, may be in the range of 600–900 ohms for the POTS band and in the range of 100–135 ohms for the xDSL band. The SLIC 30 is adapted to be coupled to first and second (RFz) resistors 217, 219, which, as described below, are utilized to define the input impedance.

The line card 10, which may be capable of supporting a plurality of subscribers lines 20, performs, among other things, two fundamental functions: DC loop supervision and DC feed. The purpose of DC feed is to supply enough power to the telephone device 12 at the customer end. The purpose of DC loop supervision is to detect changes in DC load, such as on-hook events, off-hook events and rotary dialing, or any other event that causes the DC load to change. In the interest of clarity and to avoid obscuring the invention, only that portion of the line card 10 that is helpful to an understanding of the invention is illustrated.

The voltage-feed SLIC 30 is a high voltage bipolar SLIC that drives voltages to the subscriber line 20 and senses current flow in the subscriber line 20. The SLIC 30 includes first and second differential line drivers 230, 235 that interface with the subscriber line 20 via tip and ring terminals 237, 239. The tip terminal 237 is coupled to a first terminal of a first sensing resistor ($R_{ab}$) 240 and to an inverting terminal of the first line driver 230. A second terminal of the first sensing resistor 240 is coupled to an output terminal of the first line driver 230. The ring terminal 239 is coupled to a first terminal of a second sensing resistor ($R_{bd}$) 245 and to an inverting terminal of the second line driver 235. A second terminal of the second sensing resistor 245 is coupled to an output terminal of the second line driver 235.

The SLIC 30 includes a sum block 250 and a current-sensing circuit 260. The sum block 250 includes a first output terminal coupled to a non-inverting terminal of the first line driver 230, and a second (inverted) output terminal coupled to a non-inverting terminal of the second line driver 235. The sum block 250 is capable of receiving a DC feed signal (as well as ringing signals) from a DCIN terminal 265, a voice signal, a metering signal, and a data signal and is capable of adding one or more of the received signals and providing it to the first and second line drivers 230, 235. The signals into the SUM block 250 may be subjected to different levels of gain for optimal performance. The signal from the DCIN terminal 265 is low-pass filtered.

The current-sensing circuit 260 produces a current proportional to the loop current through the current sensing resistors 240, 245, subtracts a current proportional to a current from a cancellation terminal (CANC) 270, and provides the resulting current to an IMT terminal 275 of the SLIC 30. Although not so limited, in the instant embodiment, the constant of proportionality (KCN) for the current from the cancellation terminal (CANC) 270 is unity, and the constant of proportionality for the metallic line current is 0.001. Those skilled in the art will appreciate that only those portions of the SLIC 30 deemed relevant to the invention are disclosed herein. The SLIC 30 may employ resistors or other circuitry that is not illustrated in FIG. 2.

The SLIC 30 includes a first impedance matching loop 262 that adjusts a nominal value of the input impedance ($Z_{IN}$) to substantially match the impedance of the subscriber line 20. The first impedance matching loop 262 includes a nominal Z block 263 that receives the output signal of the current sensing circuit and provides a selected amount of "fixed" gain and phase to adjust a nominal value of the input impedance, $Z_{IN}$. In the illustrated embodiment, the nominal Z block 263 sets the nominal value of the input impedance to a fixed value of 100 ohms plus 800 ohms in parallel with 34 nF, which includes the resistance provided by resistors 217, 219, 240 and 245.

The SLIC 30 is connected to the SLAC 215, an external resistor 280, as well as a capacitor 281. A first terminal of the resistor 280 is coupled to the IMT terminal 275 of the SLIC 30, as well as to the VIN terminal 285 of the SLAC 215. A second terminal of the resistor 280 is coupled to a reference voltage node 282, as well as to a terminal of the capacitor 281. In one embodiment, the reference voltage 282 is in the range of about 1.4 volts. The external resistor 280 and the capacitor 281 form a single-pole low pass filter 283 that is capable of filtering at least a portion, if not all, of the signals above the voice band, such as data signals and metering signal. The external resistor 280 and the capacitor 281 convert the current flowing from the IMT terminal 275 to a proportional voltage signal for the SLAC 215. Although not necessary, the resistor 280 is external in the illustrated embodiment because in some embodiments it may be useful for the drive value of the resistor to be relatively precise and because each line card 10 may require different values.

A discrete network 288 couples the SLIC 30 to the SLAC 215 via the CANC terminals 270, 290. The discrete network 288 includes a first and second resistor 292, 294 and a capacitor 296. A first terminal of the first resistor 292 is coupled to the CANC terminal 270 of the SLIC 30 and a second terminal of the first resistor 292 is coupled to a first terminal of the second resistor 294. The second terminal of the second resistor 294 is coupled to the CANC terminal 290 of the SLAC 215. The capacitor 296 is coupled between the second terminal of the first resistor 292 and the reference voltage node 296. The discrete network 288 acts as a low pass filter and converts the voltage output signal from the SLAC 215 to a current and provides it to the SLIC 30.

The SLAC 215 interfaces with the telephonic device 12 through the SLIC 30 and over the subscriber line 20. The SLAC 215 includes two feedback loops: a DC cancellation loop 298 and a DC feed loop 300. In the illustrated embodiment, the two loops 298, 300 are implemented within a digital signal processor (DSP). Only those portions of the SLAC 215 deemed relevant to the instant invention are described herein, albeit the SLAC 215 may perform a variety of other functions that are not illustrated in FIG. 2.

The DC cancellation loop 298 includes an analog-to-digital converter 305, DC cancellation logic 315, a current limiter 317, and a digital-to-analog converter 319. In the illustrated embodiment, to reduce hardwire complexity, the voice and DC components of the input signal from the VIN terminal 285 share the same analog-to-digital converter 305. The analog-to-digital converter 305 and digital-to-analog converter 319 include a decimator and interpolator, respectively. The analog-to-digital converter 305 in the illustrated embodiment is capable of providing two output signals, the first output signal is sampled at a 4 KHz frequency and provided as a digital signal to the DC cancellation logic 315, as well as to a switch hook detection logic 320. The second output signal of the analog-to-digital converter 305, comprising of voice and/or data (residual) components, is sampled at 32 KHz and provided to a CODEC (not shown). A residual data component may exist at the output of the analog-to-digital converter 305 since the single-pole low pass filter 283 may not remove all of the data signal; however, this signal is removed by the decimator.

The DC cancellation logic 315 receives the digital signal from the analog-to-digital converter 305, filters high frequencies, and provides a substantially DC signal. The DC signal is provided as an input to the DC feed logic 321, as well as to the current limiter 317. The output of the current limiter 317 is converted to an analog signal and then provided back to the SLIC 30 via the CANC terminal 270. The output of the current limiter 317 is also provided to the switch hook detection logic 320 for switch hook detection during pulse dialing. The current provided to the CANC terminal 270 of the SLIC 30 is used to cancel the DC component of the signal from the current sense circuit 260. Thus, during a "stable" state (i.e., no transients present), the signal at the VIN terminal 285 of the SLAC 215 is essentially DC free.

The DC feed loop 300, in addition to the analog-to-digital converter 305 and DC cancelation logic 315, includes DC feed logic 321 and a digital-to-analog converter 322. In the illustrated embodiment, the digital-to-analog converter 322 may also interpolate. The output from the digital-to-analog converter 322 is provided to a DCIN terminal 265 of the SLIC 30 via VHL terminal 323 of the SLAC 215. The DC feed logic 321 is capable of providing high DC voltage to the subscriber loop so that sufficient current (20–60 mA) can be driven through a resistance as high as 2K ohms. When the DC conditions on the subscriber loop change suddenly, the DC feed logic 321 adapts to the change, thereby allowing normal transmission to continue. Examples of sudden changes in DC conditions include on-hook, off-hook, rotary dialing, and tone signaling. When the telephonic device 12 goes off-hook, the loop impedance drops almost instantly to a value below 2K ohms. In short subscriber loops, the loop impedance may be less than 200 ohms. For the line card 10 to function and transmit information properly, the DC conditions on the subscriber loop should be stabilized quickly, and in some cases, within milliseconds.

Figure 3:
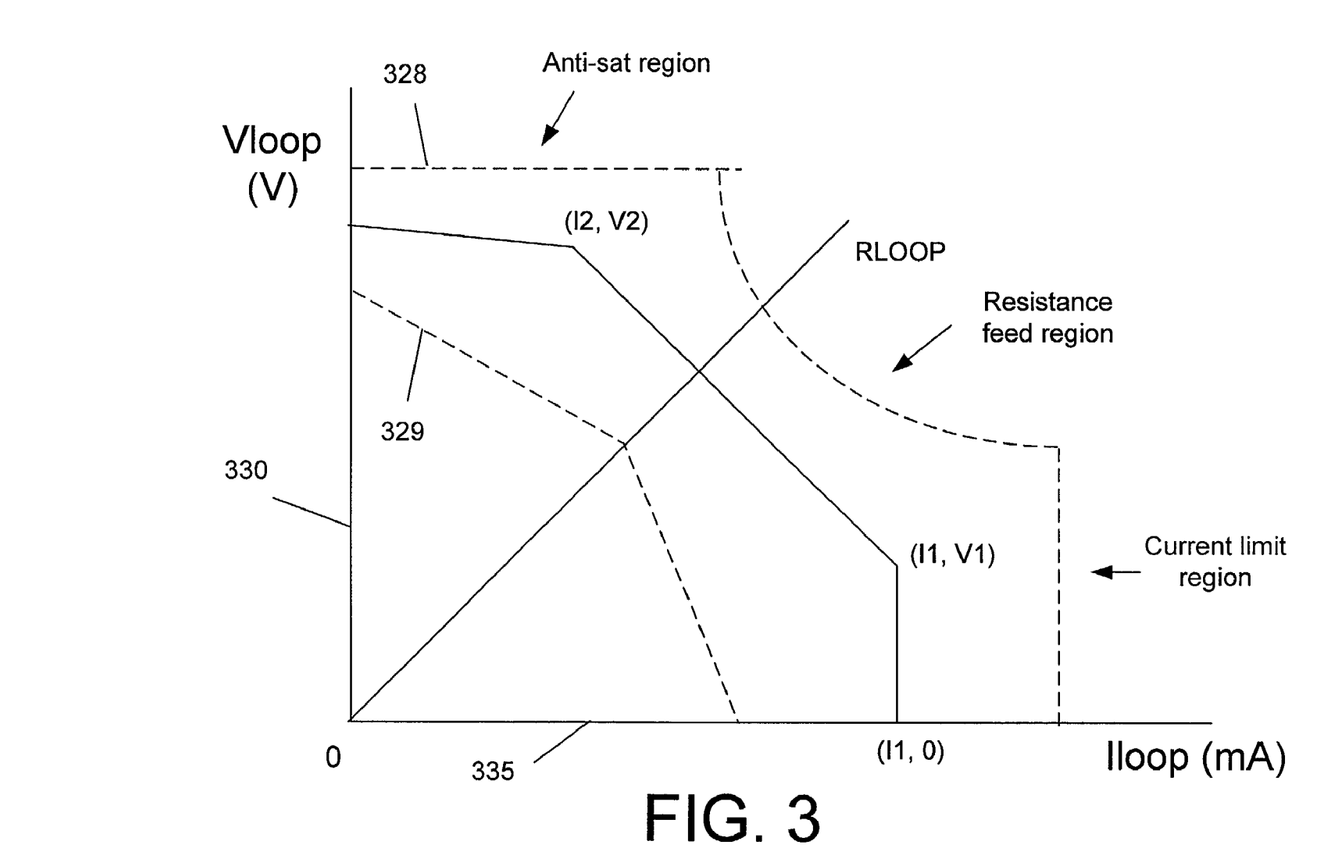
FIG. 3 depicts an exemplary DC feed curve that may be employed by the line card of FIG. 2.

FIG. 3 illustrates an exemplary DC feed curve that may be adapted for use by the DC feed logic 321. A dashed line 328 provides the upper limits for the electrical power, and a dashed line 329 provides the lower limits for the electrical power provided to the subscriber loop. A Y-axis 330 represents voltage, and an X-axis 335 represents current. As can be seen in FIG. 3, although not so limited, the DC feed curve includes an anti-saturation region, a resistance feed region, and a current limit region.

The SLAC 215 includes a second matching loop 324 that includes an impedance matching block 325. The impedance matching block 325 receives the signal from the VIN terminal 285 of the SLAC 215 and provides an output signal to an VOUT terminal 326 of the SLAC 215. The signal from the VOUT terminal 326 is provided to a VIN terminal 327 of the SLIC 30. The sum block 250 receives the signal from the VIN terminal 327 of the SLIC, sums the signal with other signals, such as DC feed signal, the data signal, and metering signal, and provides the resulting signal to the drivers 230, 235 of the SLIC 30.

When the line card is in a "stable" state (i. e., no transients), the signal at the VIN terminal 285 of the SLAC 215 comprises primarily a voice signal, although it may include residual metering or data signals that are not removed by the single-pole low pass filter 283. This single-pole low pass filter 283 provides adequate performance by attenuating the data and metering signals to acceptable levels. Aside from being more cost effective than higher order low-pass filters, the single-pole low pass filter 283 also provides an added advantage in that it is less likely to make the line card 10 unstable.

Figure 4:
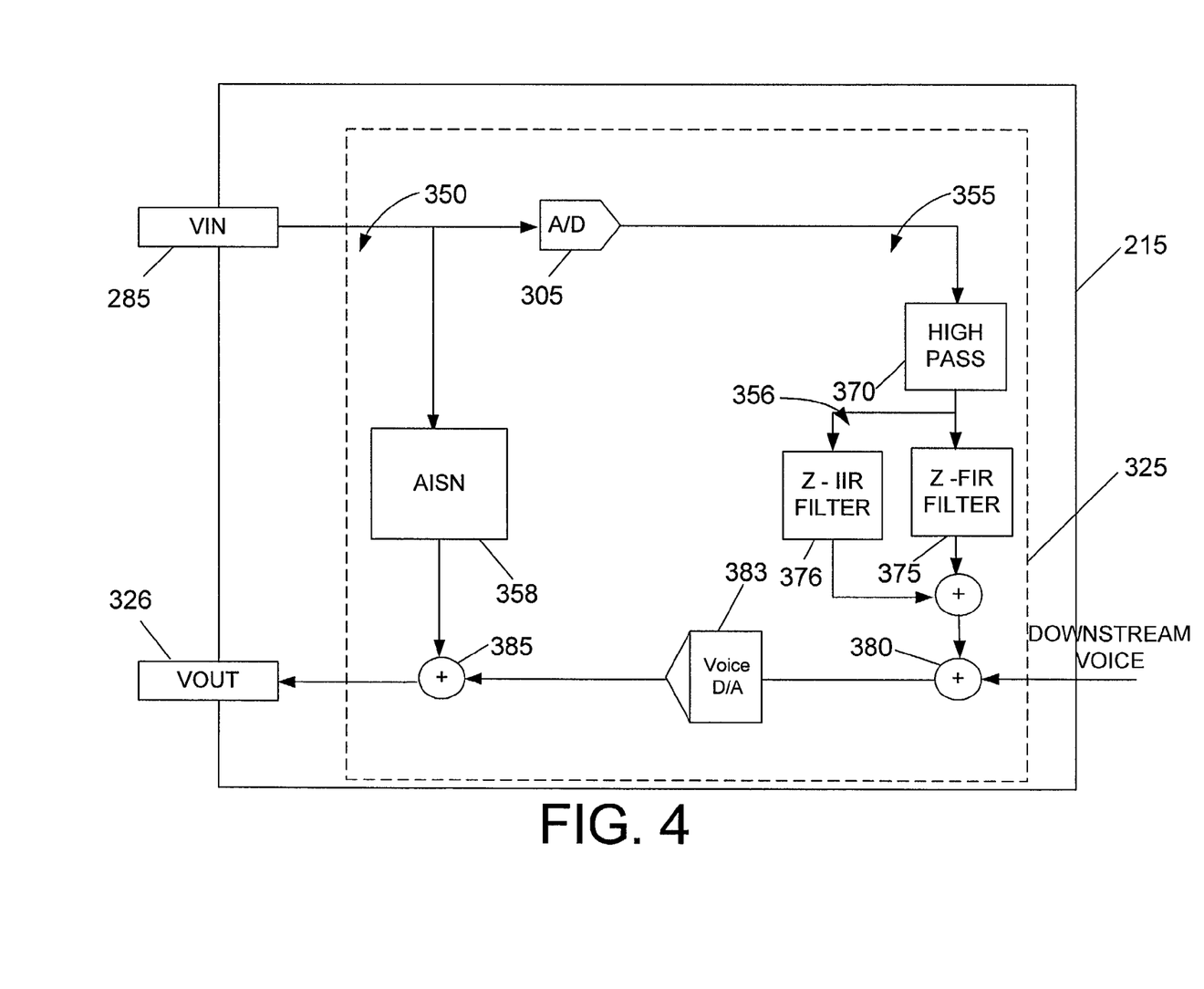
FIG. 4 illustrates an embodiment of an impedance matching module that may be employed by the line card of FIG. 2.

Referring now to FIG. 4, a specific embodiment of the impedance matching module 325 is shown. As can be seen with reference to FIG. 4, the impedance matching module 325 comprises three loops: an analog impedance scaling network (AISN) loop 350 and two Z-filter loops 355, 356. The AISN loop 350 includes an AISN block 358 that is coupled between the VIN and VOUT terminals 285, 326 of the SLAC 215. The signal present at the VIN terminal 285 of the SLAC 215 is low-pass filtered to prevent higher frequencies of the data band from impairing the function of the impedance matching module 325, although some frequencies above the voice band range that might not have been filtered may be present at the VIN terminal 285. The AISN block 358 may be a programmable impedance matching filter that is capable of varying the nominal value of the input impedance that is set by the nominal-Z block 263 (see FIG. 2) of the SLIC 30. Typically, the AISN block 358 is effective in adjusting the input impedance for frequencies throughout the voice band. This impedance is relatively constant in the voice band.

The fixed analog gain forms an impedance which is equal to the product of the current sense gain (KIMT) times the impedance of the parallel combination of the external resistance (RIMT) and capacitance (CIMT) times the feedback (NOMINAL-Z) gain. Taking into account the external fuse resistance (RF), equation (1) below illustrates the impedance:

$$Z_{IN}^{(5)} = RFZ + KIMT * KZ * \frac{RIMT}{1 + RIMT * CIMT * S} \qquad (1)$$

where the exemplary values are as follows: RFZ=100 Ω; KIMT=0.001; NOMINAL-Z=8; RIMT=100 KΩ; and CIMT=270 pF (+6 pF of stray capacitance). This leads to an input impedance of 100 Ω+(800 Ω∥35.5 F).

The programmable analog gain (AISN) inside the SLAC 215 has substantially the same effect as NOMINAL-Z. In the illustrated embodiment, the gain varies from $^{15}/_{16}$ to $^{15}/_{16}$ in $^{1}/_{16}$ steps inside the SLAC 215. This is passed through a gain of KIN=5 inside the SLIC 30. The effect is to increase or decrease KL by as much as 4.6875. This allows the 800 Ω resistor to be lowered to 331.25 Ω or raised to 1268.75 Ω. The corner frequency is unchanged.

The Z-filter loop 355 of the impedance matching module 325 receives a signal from the analog-to-digital converter 305. The analog-to-digital converter 305 converts the signal from the VIN terminal 285 of the SLAC 215 to a digital signal and delivers it to the high pass filter 370. In the illustrated embodiment, the analog-to-digital converter 305 also, through the process of decimation, reduces the frequency of the bits of the signal and provides a more accurate signal to the input terminals of the Z-filters 375, 376. The CANC input terminal 270 of the SLIC 30 is used to remove most of the DC feed component. The high-pass filter 370 substantially reduces the residual DC component, if one is present, from the received signal and provides primarily a voice-only-signal to an input terminal of the Z-filters 375, 376.

The Z-FIR filter 375 may be a programmable impedance matching filter that allows a user to program the gain factor, the phase shift, or a combination thereof to vary $Z_{IN}$. Typically, the Z-FIR filter 375 provides a frequency variable input impedance to the line card 10. The Z-FIR filter 375 also attempts to account for delays in the input signal caused by digital processing, for example, during decimation and interpolation. The programmable Z-FIR filter 375 further modifies the analog gains with a frequency variable gain. This allows control of the midband frequency characteristics. For very high frequencies, the delay in the digital interpolation and decimators reduces the effectiveness of the Z-FIR filter 375. At low frequencies, the limited length of the Z-FIR filter 375 limits the filter; however, the Z-IIR filter 376 then takes over.

The Z-IIR filter 376 provides a single pole low pass filter for responses which demand a long exponential time response. This has the effect of applying what looks like a large capacitor in series with the rest of the network.

The output from the Z-FIR filter 375 and Z-IIR filter 376 is added and provided to a first signal adder 380, which adds the filter 375, 376 output to a downstream voice signal. The output of the first signal adder 380 is provided to a digital-to-analog converter 383 that converts the received signal and provides an analog output signal to a second signal adder 385. The second signal adds the signal from the AISN block 358 and the digital-to-analog converter 383 and provides a resulting signal to the VOUT terminal 326 of the SLAC 215. The signal from the VOUT terminal 326 of the SLAC 215 is delivered to the subscriber line 20 through the SLIC 30.

The input impedance, $Z_{IN}$, produced by the nominal Z block 263, AISN block 358, and Z-filters 375, 376 is calculated according to equation (2):

$$Z_{IN} = Kimt * R_{280} * (NOMINAL\text{-}Z + KIN * (Kaisn + \text{Nominal-}zfil)) + R_{217} + R_{219} + R_{240} + R_{245} \quad (2)$$

where Kimt is the constant of proportionality for the metallic line current, $R_{280}$, $R_{217}$, $R_{219}$, $R_{240}$, and $R_{245}$ correspond to the resistors shown in FIG. 2 having respective values of 100000, 35, 35, 15, and 15 ohms, NOMINAL-Z is a fixed amount of injection gain in the SLIC 30 from IMT terminal 275 to the output of SLIC 30, KIN is a no-load gain from VIN terminal 327 of the SLIC to the output of the SLIC 30, Kaisn is an impedance adjustment factor of the AISN block 358, and Nominal-zfil is the frequency variable gain provided by the Z-filter 375.

For example, if a 600-ohm resistive impedance is required for the voice band, then the output of the AISN block 358 is adjusted so that $Z_{IN}$ substantially equals 600 ohms. To obtain the desired 600 ohms resistive impedance, an exemplary value of Kaisn may be −0.6, as shown below. Furthermore, for illustrative purposes, assume that Kimt=0.001, NOMINAL-Z=8, and KIN=5. Substituting the exemplary values provided above into equation (2) yields: $Z_{IN}$=0.001*100000*(8+5*(−0.6+0))+35+35+15+15=600. There may be a capacitive element due to CIMT (281). This can be neutralized by a suitable choice of the digital Z-filter. Like-wise, other values of resistive impedance may be obtained by adjusting the Kaisn and/or Nominal-zfil values.

The input impedance, $Z_{IN}$, for the data band is primarily governed by the values of resistors 217, 219, 240, and 235. This is because the low pass filter 283 between the IMT terminal 275 of the SLIC 30 and VIN terminal 285 of the SLAC 215, isolates the nominal Z block 263 (see FIG. 2), AISN block 358, and Z-filter block 375 for the higher frequencies of the data band. When the data band is substantially isolated from the nominal Z block 263 and the impedance matching module 325, the natural impedance of the line card 10 substantially equals the impedance of the data band. The data impedance is therefore set primarily by the resistors 217, 219, 240, and 245. Exemplary values of the resistors 217, 219, 240, and 245 are 35, 35, 15, and 15 ohms, respectively.

Figure 5:
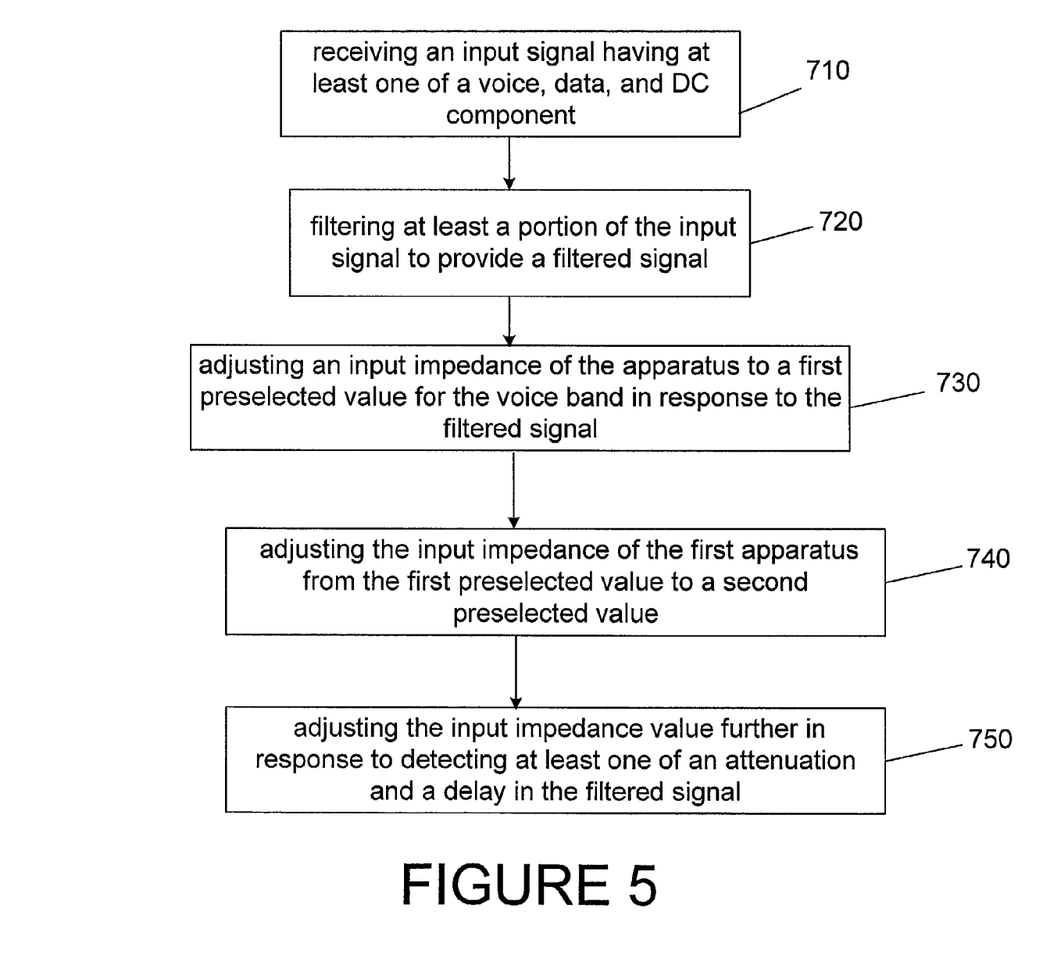
FIG. 5 illustrates a method in accordance with the present invention that may be implemented by the line card of FIG. 2.

The method of FIGS. 5 can be implemented by the line card 10 of FIG. 2 to adjust $Z_{IN}$ to substantially match $Z_{LOOP}$ for signals in the voice, as well as the data, band. The method of FIG. 5 begins at block 710, where the line card 10 receives an input signal having at least one of a voice, data, and DC component. At block 720, the low-pass filter 283 filters at least a portion of the data component and DC component of the input signal to provide a filtered signal. At block 730, the nominal Z block 263 of the SLIC 30 adjusts the input impedance of the line card 10 to a first preselected value for the voice band in response to the filtered signal. For example, the nominal Z block 263 may adjust the input impedance of the line to 900 ohms, or to any other desirable level. An exact match is not required, as the AISN block 358 is utilized in accordance with the present invention to arrive at a more precise value.

At block 740, the AISN block 358 adjusts the input impedance of the first apparatus from the first preselected value to a second preselected value. Thus, for example, the second preselected value may be a more precise value of the first preselected value. In the illustrated embodiment, the AISN block 358 is implemented in an analog circuit in the SLAC 215. The AISN block 358 operates in combination with the nominal Z block 263 to arrive at or near the desired input impedance value. The AISN algorithm of the AISN block 358 includes a finite number of gain steps to arrive at the desired range of the input impedance. For this reason, it is desirable to utilize the nominal Z block 263 to first arrive in proximity to the first preselected value of the input impedance and then use any of the remaining bits available to the AISN algorithm to obtain the second preselected value of the input impedance.

At block 750, the Z-filter block 375 adjusts the input impedance further in response to detecting at least one of attenuation and delay in the filtered signal. That is, the Z-filter block 375 is capable of modifying the gain and phase characteristics of the input signal by a selected amount to adjust $Z_{IN}$ to substantially equal $Z_{LOOP}$ for the POTS (i.e., voice) band.

The AISN and Z-filter blocks 358, 375 may be implemented within a mixed signal integrated circuit. Furthermore, in accordance with the present invention, the two blocks may be implemented as hardware, software, or a combination thereof.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of impedance matching voice and data signals received by an apparatus, comprising:
   receiving an input signal having at least one of a voice component, data component, and DC component;
   filtering at least a portion of the data component and DC component of the input signal to provide a filtered signal;
   adjusting an input impedance of the apparatus to a first preselected value for the voice band in response to the filtered signal;
   adjusting the input impedance of the apparatus from the first preselected value to a second preselected value; and
   adjusting at least one of a magnitude and phase of the filtered signal to adjust the input impedance to a third value.

2. The method of claim 1, wherein filtering at least the portion of the DC component includes filtering the DC component using a DC cancellation loop.

3. The method of claim 1, wherein filtering at least a portion of the data component includes filtering at least portion of the data component using a single-pole low pass filter.

4. The method of claim 1, further including adjusting the input impedance of the apparatus to a fourth preselected value for the data band.

5. The method of claim 4, wherein the fourth preselected value is in a range of 100 to 135 ohms.

6. The method of claim 4, wherein adjusting the input impedance includes adjusting the frequency characteristic of the filtered signal by a selected interval.

7. The method of claim 4, wherein the first preselected value is in a range of 600 to 1200 ohms.

8. An apparatus for impedance matching, comprising:
circuitry adapted to receive an input signal having at least one of a voice, data, and DC component;
a first filter adapted to filter at least a portion of the data component of the input signal to provide a filtered data signal;
a second filter adapted to filter at least a portion of the DC component of the filtered data signal to provide a filtered signal;
a first impedance block adapted to adjust an input impedance of the apparatus to a first preselected value for the voice band in response to the filtered signal;
a second impedance block adapted to adjust the input impedance of the apparatus from the first preselected value to a second preselected value; and
a third impedance block adapted to adjust at least one of a magnitude and phase of the filtered signal to adjust the input impedance to a third value.

9. The apparatus of claim 8, wherein the second filter includes a DC cancellation loop capable of removing the portion of the DC component.

10. The apparatus of claim 8, wherein the first filter comprises a single-pole low pass filter.

11. The apparatus of claim 8, further including at least one resister for defining the input impedance of the apparatus to a fourth preselected value for the data band.

12. The apparatus of claim 11, wherein the fourth preselected value is in a range of 100 to 135 ohms.

13. The apparatus of claim 12, wherein the second impedance block and the third impedance block comprise a programmable impedance matching filter.

14. The apparatus of claim 12, wherein the first impedance block adapted to adjust the input impedance includes the first impedance block adapted to adjust the frequency of the filtered signal.

15. An apparatus for impedance matching, comprising:
circuitry adapted to receive an input signal having a voice, data, and DC component;
a first filter adapted to filter at least a portion of the data component of the input signal to provide a filtered data signal;
a second filter adapted to filter at least a portion of the DC component of the filtered data signal to provide a filtered signal;
a first feedback loop adapted to adjust an input impedance of the apparatus to a first preselected value for the voice band in response to the filtered signal;
a second feedback loop adapted to adjust the input impedance of the first apparatus from the first preselected value to a second preselected value; and
a third feedback loop adapted to adjust at least one of a magnitude and phase of the filtered signal to adjust the input impedance to a third value.

16. The apparatus of claim 15, wherein the third feedback loop comprises:
a filter capable of removing at least a portion of a residual DC component from the filtered signal and providing an output signal; and
a Z-filter block capable of adjusting a frequency response of the output signal.

17. The apparatus of claim 15, further including at least one resister for defining the input impedance of the apparatus to a fourth preselected value for the data band.

18. The apparatus of claim 17, wherein the fourth preselected value is in a range of 100 to 135 ohms.

19. An apparatus supporting transmission of signals carrying voice and data on a subscriber line, comprising:
a subscriber line interface circuit adapted receive an input signal having a voice, data, and DC component;
a first filter adapted to filter at least a portion of the data component of the input signal to provide a filtered data signal;
a second filter adapted to filter at least a portion of the DC component of the filtered data signal to provide a filtered signal; and
wherein the subscriber line interface circuit includes a first loop adapted adjust an input impedance of the apparatus to a first preselected value for the voice band in response to the filtered signal; and
a digital signal processor comprising:
a second feedback loop adapted to adjust the input impedance of the apparatus from the first preselected value to a second preselected value; and
a third feedback loop adapted to adjust at least one of a magnitude and phase of the filtered signal to adjust the input impedance to a third value.

20. The apparatus of claim 19, wherein the subscriber line integrated circuit is a voltage subscriber line interface circuit.

21. The apparatus of claim 19, the third feedback loop comprises:
a filter capable of removing at least a portion of a residual DC component from the filtered signal and providing an output signal; and
a Z-filter block capable of adjusting at least one of a gain and phase of the output signal.

22. The apparatus of claim 21, further including at least one resister for defining the input impedance of the apparatus to a selected value for the data band.

23. The apparatus of claim 22, wherein the selected value is in a range of 100 to 135 ohms.

24. An apparatus, comprising:
means for receiving an input signal having at least one of a voice component, data component, and DC component;
means for filtering at least a portion of the data component and DC component of the input signal to provide a filtered signal;
means for adjusting an input impedance of the apparatus to a first preselected value for the voice band in response to the filtered signal;
means for adjusting the input impedance of the first apparatus from the first preselected value to a second preselected value; and
means for adjusting at least one of a magnitude and phase of the filtered signal to adjust the input impedance to a third value.

* * * * *